United States Patent
Hashemi et al.

(10) Patent No.: US 11,275,744 B2
(45) Date of Patent: *Mar. 15, 2022

(54) DISAGGREGATING LATENT CAUSES FOR COMPUTER SYSTEM OPTIMIZATION

(71) Applicant: Google LLC, Mountain View, CA (US)

(72) Inventors: Milad Olia Hashemi, San Francisco, CA (US); Parthasarathy Ranganathan, San Jose, CA (US); Harsh Satija, Quebec (CA)

(73) Assignee: Google LLC, Mountain View, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/840,699

(22) Filed: Apr. 6, 2020

(65) Prior Publication Data

US 2020/0233871 A1    Jul. 23, 2020

Related U.S. Application Data

(63) Continuation of application No. 15/726,130, filed on Oct. 5, 2017, now Pat. No. 10,650,001.

(51) Int. Cl.
*G06F 16/00*    (2019.01)
*G06F 16/2455*    (2019.01)
(Continued)

(52) U.S. Cl.
CPC ....... *G06F 16/24568* (2019.01); *G05B 13/00* (2013.01); *G06F 16/1767* (2019.01);
(Continued)

(58) Field of Classification Search
CPC .......... G06F 16/24568; G06F 16/1767; G06F 16/24544; G06N 20/00; G06N 3/084; G06N 3/0445; G06N 3/0454; G05B 13/00
See application file for complete search history.

(56) References Cited

U.S. PATENT DOCUMENTS 6,615,367 B1    9/2003 Unkle et al.
7,886,046 B1    2/2011 Zeitoun et al.
(Continued)

FOREIGN PATENT DOCUMENTS

WO    WO 2016/077089    5/2016
WO    WO 2016/100142    6/2016

OTHER PUBLICATIONS

Chung et al. "A Recurrent Latent Variable Model for Sequential Data," arXiv 1506.02216, Apr. 6, 2016, 9 pages.
(Continued)

*Primary Examiner* — Shiow-Jy Fan
(74) *Attorney, Agent, or Firm* — Fish & Richardson P.C.

(57) ABSTRACT

Methods, systems, and apparatus, including computer programs encoded on a computer storage medium, for disaggregating latent causes for computer system optimization. In one aspect, a method includes accessing a data stream for data values resulting from operations performed by a computer system; providing the data values as input to a data disaggregation machine learning model that generates descriptors of latent causes of the data values; providing the data values and the descriptors of the latent causes of the data values as inputs to a control system model that generates embedded representations of commands to modify the operations performed by the computer system; determining commands to modify the operations performed by the computer system based on the embedded representations of commands to modify the operations performed by the computer system; and providing the commands to the computer system.

20 Claims, 4 Drawing Sheets

(51) Int. Cl.
*G06N 3/08* (2006.01)
*G06N 3/04* (2006.01)
*G05B 13/00* (2006.01)
*G06F 16/176* (2019.01)
*G06F 16/2453* (2019.01)
*G06N 20/00* (2019.01)

(52) U.S. Cl.
CPC ..... *G06F 16/24544* (2019.01); *G06N 3/0454* (2013.01); *G06N 3/084* (2013.01); *G06N 3/0445* (2013.01); *G06N 20/00* (2019.01)

(56) References Cited

U.S. PATENT DOCUMENTS

| | | | |
|---|---|---|---|
| 8,407,226 | B1 | 3/2013 | Das et al. |
| 2016/0371170 | A1 | 12/2016 | Salunke et al. |
| 2017/0006135 | A1 | 1/2017 | Siebel |
| 2017/0046217 | A1 | 2/2017 | Shinde et al. |
| 2017/0193400 | A1 | 7/2017 | Bhaskar et al. |
| 2017/0200264 | A1 | 7/2017 | Park et al. |
| 2018/0004530 | A1 | 1/2018 | Vorbach |
| 2018/0005129 | A1* | 1/2018 | Moyerman ............ G06N 20/00 |
| 2018/0275642 | A1* | 9/2018 | Tajima ................. G06N 3/0454 |
| 2019/0163848 | A1* | 5/2019 | McGranahan ......... G06N 20/00 |
| 2019/0265971 | A1* | 8/2019 | Behzadi ................. H04L 67/12 |

OTHER PUBLICATIONS

Doersch. "Tutorial on Variational autoencoders," arXiv 1606.05908v2 Aug. 13, 2016, 23 pages.

EP Office Action in European Application No. 18796154, dated Nov. 27, 2019, 3 pages.

Eslami et al. "Attend, Infer Repeat: Fast Scene understanding with Generative Models," arXiv 1603.08575, Aug. 12, 2016, 17 pages.

Jimenez et al. "Dynamic branch prediction with perceptrons," IEEE Seventh International Symposium on High-Performance Computer Architecture, Jun. 2000, 11 pages.

Johnson et al. "Composing graphical models with neural networks for structured representations and fast inference," arXiv 1603.06277v5, Jul. 7, 2017, 27 pages.

PCT International Search Report and Written Opinion in International Application No. PT/US2018/052780, dated May 10, 2019, 20 pages.

Prof Eng et al., "Dynamic Neural Branch Prediction Fundamentals", Jan. 1, 2016, XP055533437, Retrieved from the Internet: URL: http://www.agir.ro/buletine/2501.pdf [retrieved on Dec. 12, 2018] the whole document.

Whitney. "Disentangled Representations in Neural Models," Thesis, Massachusetts Institute of Technology, arXiv 1602.02383v1, Feb. 7, 2016, 62 pages.

* cited by examiner

DISAGGREGATING LATENT CAUSES FOR COMPUTER SYSTEM OPTIMIZATION

CROSS-REFERENCE TO RELATED APPLICATION

This application is a continuation application of U.S. application Ser. No. 15/726,130, filed Oct. 5, 2017, which is incorporated by reference.

BACKGROUND

This specification relates to computer system control systems.

Computer systems include hardware and software components. The operation of computer systems may rely on computer system control systems to improve and manage performance.

Computer system control systems can be based on machine learning models. Machine learning models receive an input and generate an output, e.g., a predicted output, based on the received input. Some machine learning models are parametric models and generate the output based on the received input and on values of the parameters of the model.

SUMMARY

This specification describes a computer system control system implemented on one or more computers in one or more locations that generates commands to modify the operation of a computer system.

In general, one innovative aspect of the subject matter described in this specification can be embodied in methods that include the actions of accessing a data stream for data values resulting from operations performed by a computer system of one or more computers, the data values being descriptive of the operations performed by the computer system; providing the data values as input to a data disaggregation machine learning model that generates, based on the data values, descriptors of latent causes of the data values, wherein the data disaggregation model includes a set of data disaggregation model parameters; processing, by the data disaggregation model, the data values according to the set of data disaggregation model parameters to generate the descriptors of the latent causes of the data values; providing the data values and the descriptors of the latent causes of the data values as inputs to a control system model that generates embedded representations of commands to modify the operations performed by the computer system, wherein the control system model includes a set of control system model parameters; processing, by the control system model, the data values and the descriptors of the latent causes of the data values according to the set control system model parameters to generate the embedded representations of commands to modify the operations performed by the computer system; determining commands to modify the operations performed by the computer system based on the embedded representations of the commands to modify the operations performed by the computer system generated by the control system model; and providing the commands to the computer system.

In some implementations, the disaggregation model is trained using log data that stores the data values resulting from operations previously performed by the computer system.

In some implementations, the data disaggregation model is trained using data values from the data stream, and accessing the data stream comprises receiving the data stream from the computer system.

In some implementations, the data disaggregation model is implemented in hardware.

In some implementations, the data disaggregation model is a variational auto-encoder.

In some implementations, the data values are program counter values, and the operations performed by the computer system include program instruction increments.

In some implementations, the data values are memory address values, and the operations performed by the computer system include memory accesses.

In some implementations, a performance measure of the control system model is determined based on the data values and the embedded representations of commands to modify the operations performed by the computer system and the set of control system model parameters is adjusted based on the performance measure.

In some implementations, the control system model is a recurrent neural network.

In some implementations, the commands to modify the operation performed by the computer system are commands to pre-fetch data stored at memory addresses.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

A computer system control system as described in this specification includes a control system machine learning model that processes the data values in a data stream and descriptors of the latent causes of the data values in the data stream to generate commands to modify the operation of a computer system. Conventional computer system control systems include control system machine learning models that process only the data values in the data stream. By processing both the data values and the descriptors of the latent causes of the data values, the control system machine learning model as described in this specification generates commands to modify the operation of the computer system which cause better performance of the computer system than would be achieved by conventional computer system control systems. For example, the computer system may consume fewer energy resources and optimally utilize available computational resources, where optimality may be measured through performance, fairness, maximum bandwidth consumption, or other metrics. Processing the descriptors of the latent causes of the data values may allow the control system machine learning model to be defined by fewer parameters and operate more efficiently, thus consuming fewer computer computational resources, than if the control system machine learning model did not receive as input the descriptors of the latent causes of the data values. These advantages are improvements in the field of computer system control systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a computer system control system implemented on one or more computers in one or more locations that generates commands to modify the operation of a computer system.

The computer system control system accesses data values from a data stream that results from operations performed by a computer system. A data disaggregation machine learning model takes the data values as input and generates as output descriptors of the latent causes of the data values. A latent cause of a data value is an underlying process that results in the generation of the data value. The latent cause of a data value may be the execution of an instruction, the execution of an algorithm, or the execution of a thread, among other things. A descriptor of the latent cause of a data value is a latent variable that is a compressed representation of the data value. The data values and the descriptors of the latent causes of the data values are provided as input to a control system machine learning model that generates embedded representations of commands to modify the operation of the computer system as output. A command generation engine maps the embedded representations of commands to modify the operation of the computer system to sets of commands to modify the operation of the computer system, and these sets of commands to modify the operation of the computer system are provided to the computer system. In general, the commands to modify the operation of the computer system are directed to improving the performance of the computer system, for example by improving the efficiency of the operation of the computer system.

These features and additional features are described in more detail below.

Figure 1:
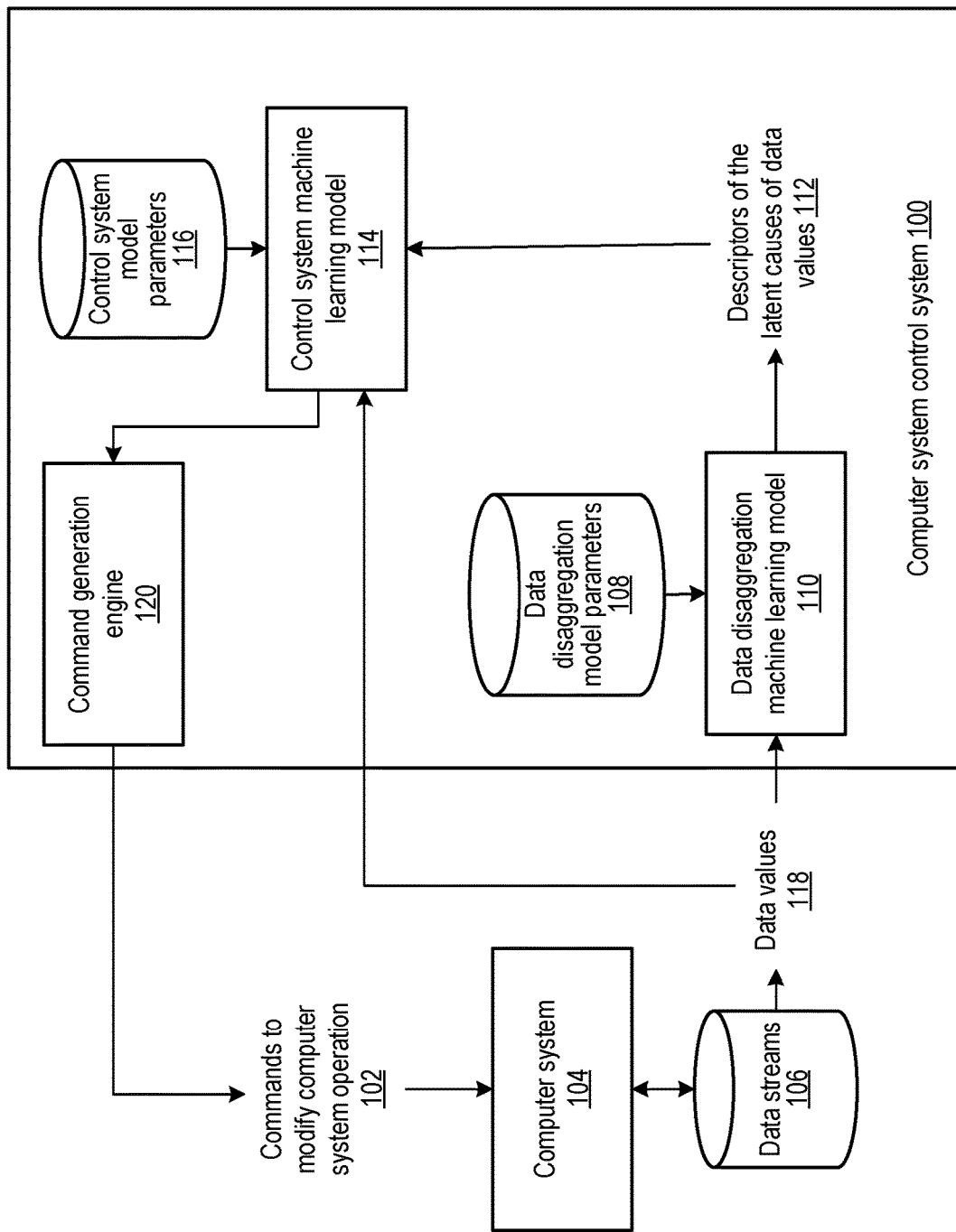
FIG. 1 is a block diagram of an example computer system control system.

FIG. 1 is a block diagram of an example computer system control system 100. The computer system control system 100 is an example of a system implemented as computer programs or hardware on one or more computers in one or more locations in which the systems, components, and techniques described below are implemented.

The computer system control system 100 includes a control system machine learning model 114 that, for each of multiple time steps, takes as input data values 118 and the descriptors of the latent causes 112 of the data values, processes the data values 118 and the descriptors of the latent causes 112 of the data values according to the values of a set of control system model parameters 116, and generates as output embedded representations of commands to modify the operation of a computer system 104. The embedded representations of commands to modify the operation of the computer system 104 are provided as input to a command generation engine 120 that generates as output commands to modify the operation 102 of the computer system 104.

The control system 100 may be one of various types. Examples of such control systems include direct/indirect branch prediction systems, address prediction systems for data/instruction prefetching, systems for implementing prefetcher throttling policies, systems for implementing cache replacement policies, systems for implementing data/instruction coherence policies, systems for implementing translation lookaside buffer (TLB) eviction policies, load/store disambiguation systems, systems for implementing instruction scheduling policies, systems for implementing thread/process scheduling policies, systems for implementing memory controller scheduling algorithms, systems for implementing interconnect message scheduling algorithms, systems for implementing cache partitioning and quality of service policies, systems for implementing bandwidth partitioning and quality of service policies, and systems for scheduling applications for cloud service providers. Control systems for controlling other aspects of a computer system can also be realized using the subject matter described in this written description.

The computer system control system 100 obtains the data values 118 from data streams 106. The data streams 106 are time-varying sequences of data values resulting from hardware and software operations performed in the computer system 104 of one or more computers, and the data values 118 of the data streams 106 are descriptive of the hardware and software operations performed by the computer system 104. For example, the data streams 106 may be data values from one or more of a memory bus, a register of a processor, control scheduling processes, a memory array, a dataflow graph, on/off chip networks, and the like. In some implementations, the data values 118 from the data streams 106 include one or more of memory addresses, program counter values, branch target values, virtual to physical address translations, instruction register dependencies, instruction memory dependencies, instruction fetch addresses, cache eviction decisions, and cache coherence states. In general, each of the data values 118 are represented as vectors.

The descriptors of the latent causes 112 of the data values 118 are latent variables generated by a data disaggregation machine learning model 110 that, for each of multiple time steps, receives data values 118 obtained from data streams 106 as input, processes the data values 118 according to the values of a set of data disaggregation model parameters 108, and generates as output the descriptors of the latent cause 112 of the data values 118. In general, the data disaggregation machine learning model 110 is a latent variable model.

In general, the descriptor of the latent cause of a data value generated by the data disaggregation machine learning model 110 is a latent variable that is a compressed representation of the data value. In some implementations, the data disaggregation machine learning model 110 may be an auto-encoder machine learning model. In some implementations, the data disaggregation machine learning model 110 may be a variational auto-encoder machine learning model. In some implementations, the data disaggregation machine learning model 110 may be a clustering machine learning model. In some implementations, the data disaggregation machine learning model may be a principal component analysis (PCA) machine learning model.

In some implementations, the control system machine learning model 114 is a deep neural network. In some implementations, the control system machine learning model 114 is a recurrent neural network. In some implementations, the control system machine learning model 114 is a support vector machine (SVM). In some implementations, the control system machine learning model 114 is a random forest of decision trees. Other control system machine learning models can also be used.

In general, the embedded representation of commands to modify the operation of the computer system 104 generated by the control system machine learning model 114 is a vector that is mapped by the command generation engine 120 to a set of commands to modify the operation 102 of the computer system 104. For example, the embedded representation of the commands to modify the operation of the computer system may be a scalar 0/1 value that indicates the prediction of the control system machine learning model 114 of whether a set of instructions being executed on a processor of the computer system 104 will take a branch. In this case, the command generation engine 120 may map the embedded representation "0" to a set of commands that cause the computer system 104 to pre-fetch instructions corresponding to instructions to be executed by a processor in the computer system 104 if the branch is not taken, and the command generation engine 120 may map the embedded representation "1" to a set of commands that cause the computer system 104 to pre-fetch instructions corresponding to instructions to be executed by a processor in the computer system 104 if the branch is taken.

In some implementations, the commands to modify the operation 102 of the computer system 104 may be commands to pre-fetch addresses from memory. In some implementations, the commands to modify the operation 102 of the computer system 104 may be commands to swap memory elements into or out of a cache of a processor. In some implementations, the commands to modify the operation 102 of the computer system 104 may be commands to distribute the allocation of one or more processes to one or more processors.

In some implementations, the computer system control system 100 is trained offline based on a stored log of data values. In the these implementations, the computer system control system 100 first trains the data disaggregation machine learning model 110 based on the stored log of data values by iteratively adjusting the data disaggregation model parameters 108 using standard machine learning training methods. For example, the data disaggregation machine learning model 110 may be a variational auto-encoder trained by stochastic gradient descent. Next, the computer system control system 100 trains the control system machine learning model 114. The data values from the stored log of data values and the descriptors of the latent causes of the data values from the stored log of data values generated by the trained data disaggregation machine learning model 110 are provided as input to the control system machine learning model 114. For each input pair of data value and descriptor of the data value latent cause, the control system machine learning model 114 generates an embedded representation of commands to modify the operation of the computer system, and the system adjusts control system model parameters 116 based on a performance measure that depends on the stored log of data values and the embedded representation of commands to modify the operation of the computer system generated by the control system machine learning model 114.

In some other implementations the computer system control system 100 is trained online, which is similar to offline training except the training is based data values accessed in real-time from data streams, as opposed to data values that are stored in a log.

In some implementations, the computer system control system 100 may be implemented as software instructions stored and executed locally in the computer system 104. In some other implementations, the computer system control system 100 may be implemented as software instructions stored and executed at a second computer system that is different from the computer system 104, and communicates with the computer system 104 over a data communication network.

In some implementations, the computer system control system 100 may be implemented as one or more hardware components of the computer system 104. For example, the computer system control system 100 may be implemented as application specific integrated circuits.

Figure 2:
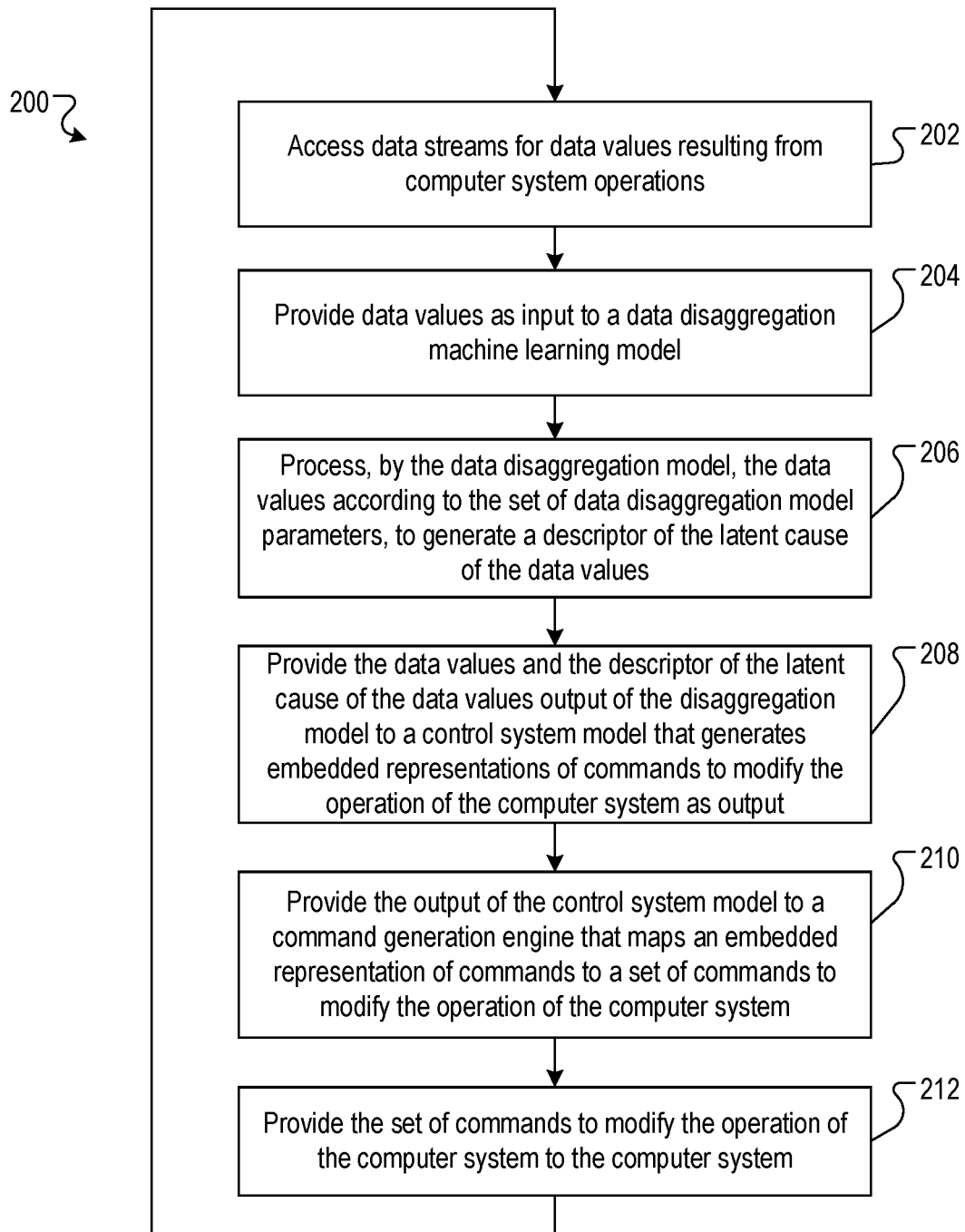
FIG. 2 is a flow diagram of an example process for generating commands to modify the operation of the computer system.

FIG. 2 is a flow diagram of an example process 200 for generating commands to modify the operation of the computer system. For convenience, the process 200 will be described as being performed by a system of one or more computers located in one or more locations. For example, a computer system control system, e.g., the computer system control system 100 of FIG. 1, appropriately implemented in accordance with this specification, can perform the process 200.

The system accesses the data values present in the data streams at the time step, where the data streams result from the hardware and software operations of a computer system (202). For example, a data stream may be a memory bus and a data value may be a memory address transmitted on the memory bus at the time that the system accesses the memory. In some implementations the system accesses multiple different data values for a time step and concatenates them into a single vector. For example, the system may access a memory address data value and a program counter data value for the time step and concatenate them into a single vector.

The system provides the data values as input to a data disaggregation machine learning model (204), and then the data disaggregation model processes the data values in accordance with the values of a set of data disaggregation model parameters to generate descriptors of the latent cause of the data values (206). The data disaggregation model may be a variational auto-encoder as described above, or an auto-encoder, or any other appropriate disaggregation model. The resulting generation of descriptors of the latent causes may also vary accordingly. Specific examples are given below.

In a first example implementation, the data disaggregation model is an auto-encoder. The system determines the activations of the hidden layers of the auto-encoder that result from the system providing the data values as input to the auto-encoder. Based on this determination, the system generates a descriptor of the latent cause for the data values that corresponds to the activations of one or more hidden layers of the auto-encoder.

By way of another example, the data disaggregation model is a variational auto-encoder and the system determines the activations of the hidden layers of the variational auto-encoder that result from the system providing the data values as input to the variational auto-encoder. Based on this determination, the system generates a descriptor of the latent cause for the data values that corresponds to the parameters of the distribution of the random latent variable of the variational auto-encoder corresponding to the data values.

In still other implementations, the data disaggregation model is a variational auto-encoder and follows the same procedure just described, but generates a descriptor of the latent cause for the data values that corresponds to a sample from the distribution of the random latent variable of the variational auto-encoder corresponding to the data values.

In some other implementations, the data disaggregation model is a clustering model and the system determines the cluster center that is closest to the data values and generates a descriptor of the latent cause for the data values that corresponds to a representation of the cluster center.

In some other implementations, the data disaggregation model is a principal component analysis (PCA) model and the system determines the inner product of the data values and one or more selected principal component vectors, and generates a descriptor of the latent cause for the data values by sequentially concatenating the inner products of the data values and the one or more selected principal component vectors.

The above examples are not exhaustive, and still other disaggregation models may be used.

The system provides the data values and descriptor of the latent cause of the data values output by the data disaggregation model to a control system machine learning model that processes the data values and the descriptor of the latent cause of the data values in accordance with the values of a set of control system model parameters to generate as output an embedded representation of commands to modify the operation of the computer system (208).

The data values and the descriptor of the latent cause of the data values output by the data disaggregation machine learning model are represented by vectors, and the system provides the concatenation of the vectors representing the data values and the descriptor of the latent cause of the data values as input to the control system model. The control system model generates an embedded representation of commands to modify the operation of the computer system that is represented as a vector.

In some implementations, the control system model is a neural network and the control system model processes the data values and the descriptor of the latent cause of the data values by sequentially applying a non-linear transformation to the input at each of a plurality of hidden layers. In this case, the activations of the output layer are the embedded representation of commands to modify the operation of the computer system.

The system provides the output of the control system model to a command generation engine that maps the embedded representation of commands to a set of commands to modify the operation of the computer system according to a pre-determined mapping (210).

In some implementations, the embedded representation of the commands to modify the operation of the computer system may be a scalar 0/1 value that indicates the prediction of the control system machine learning model of whether a set of instructions being executed on a processor of the computer system will take a branch. In this case, the command generation engine may map the embedded representation "0" to a set of commands that cause the computer system to pre-fetch instructions corresponding to instructions to be executed by a processor in the computer system if the branch is not taken, and the command generation engine may map the embedded representation "1" to a set of commands that cause the computer system to pre-fetch instructions corresponding to instructions to be executed by a processor in the computer system if the branch is taken. Other data encoding schemes for commands may also be used.

The system provides the set of commands to modify the operation of the computer system to the computer system (212). The process 200 returns to 202 and repeats the preceding operations.

Figure 3:
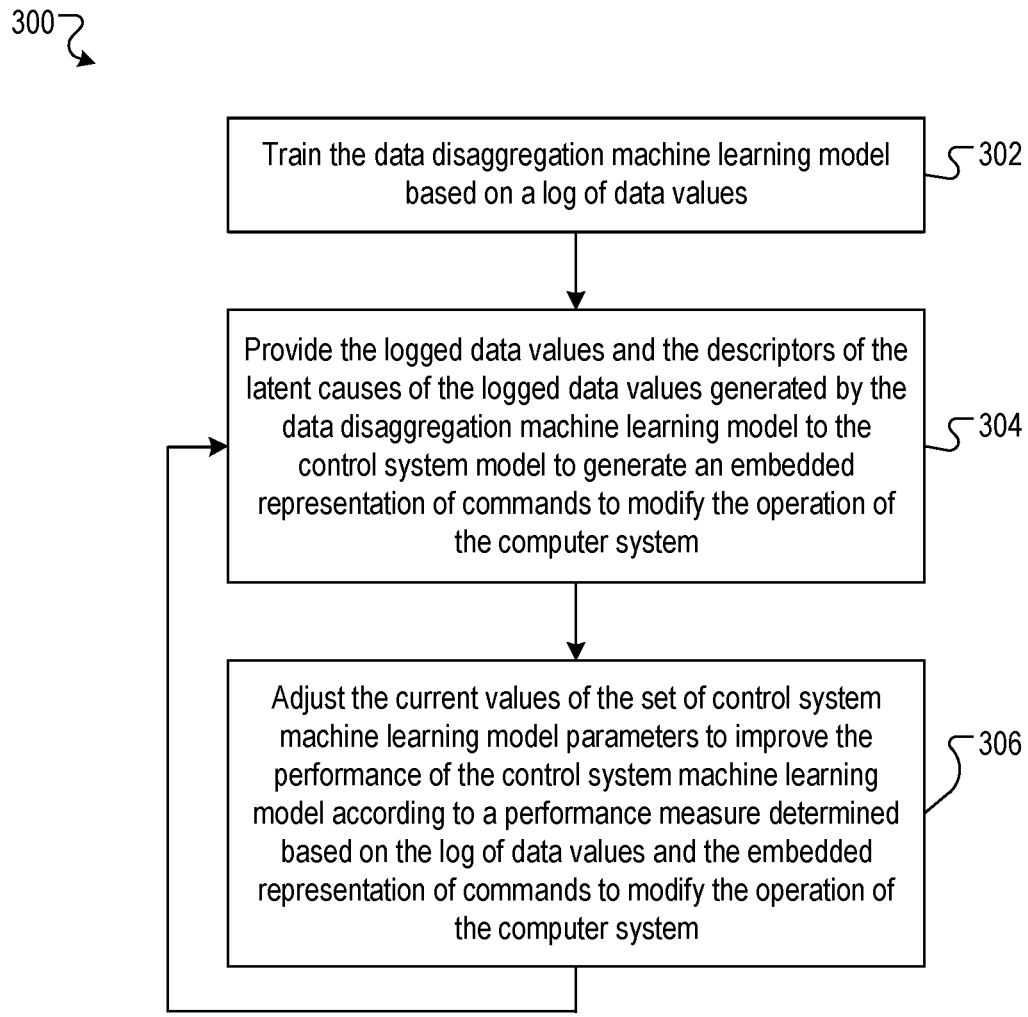
FIG. 3 is a flow diagram of an example process for training a computer system control system.

FIG. 3 is a flow diagram of an example process 300 for training the computer system control system. For convenience, the process 300 will be described as being performed by a system of one or more computers located in one or more locations. For example, a computer system control system, e.g., the computer system control system 100 of FIG. 1, appropriately implemented in accordance with this specification, can perform the process 300.

The description which follows describes a process 300 for offline training of the system.

The system trains the data disaggregation machine learning model based on a stored log of data values using standard machine learning training methods (302). The log of data values are data values previously accessed from data streams descriptive of the operation of one or more computer systems and stored in the log.

In some implementations, the data disaggregation model is an auto-encoder, and the auto-encoder is trained by providing the data values as input to the auto-encoder, and iteratively adjusting the values of the set of parameters of the auto-encoder by stochastic gradient descent, where the gradient of a loss function is backpropagated through the auto-encoder, and where the loss function measures the deviation of the output of the auto-encoder from the data value input to the auto-encoder.

In some other implementations, the data disaggregation model is a variational auto-encoder and is trained similarly to an auto-encoder, where the loss function includes an additional Kullback-Leibler (KL) divergence terms that forces the latent representations encoded in a hidden layer of the variational auto-encoder to follow a pre-defined distribution, for example, a unit Gaussian distribution or a Bernoulli distribution. An example of a variational auto-encoder neural network that can be used to generate latent representations is described in "Tutorial on Variational autoencoders", arXiv preprint arXiv:1606.05908v2 (2016).

In some other implementations, the data disaggregation model is a clustering model that assigns data values to groups so that data values in a same group are more similar to each other according to a similarity metric. For example, the clustering model may be trained by a k-means algorithm or an EM algorithm.

The system provides one or more of the logged data values and the corresponding descriptors of the latent causes of the logged data values generated by the data disaggregation model to the control system model to generate embedded representations of commands to modify the operation of the computer system (304). The system then adjusts the current values of the set of control system model parameters to improve the performance of the control system model according to a performance measure determined based on the log of data values and the embedded representation of commands to modify the operation of the computer system generated by the control system machine learning model (306).

In some implementations, the control system model is a deep recurrent neural network and the system adjusts the current values of the set of neural network model parameters by stochastic gradient descent via backpropagation through time.

In some implementations, the embedded representation of the commands to modify the operation of the computer system may be a scalar 0/1 value that indicates the prediction of the control system model of whether a set of instructions being executed on a processor of the computer system will take a branch, and the performance measure may be a loss function that has value 0 if the prediction of the control system model of whether the branch is taken is correct and has value 1 if the prediction of the control system model of whether the branch is taken is not correct.

In some other implementations, the embedded representation of commands to modify the operation of the computer system may be an embedded representation of a memory address to be pre-fetched for an application, and the performance measure may be a cross-entropy loss function.

In some other implementations, the embedded representation of commands to modify the operation of the computer system may be an embedded representation of a difference between a current memory address and a memory address to be pre-fetched for an application, and the performance measure may be a cross-entropy loss function.

In some implementations, the system may also be trained online. The system is trained online by executing the steps of the process 300 dynamically with data values that are accessed in real-time from data streams, as opposed to data values that are stored in a log.

Figure 4A:
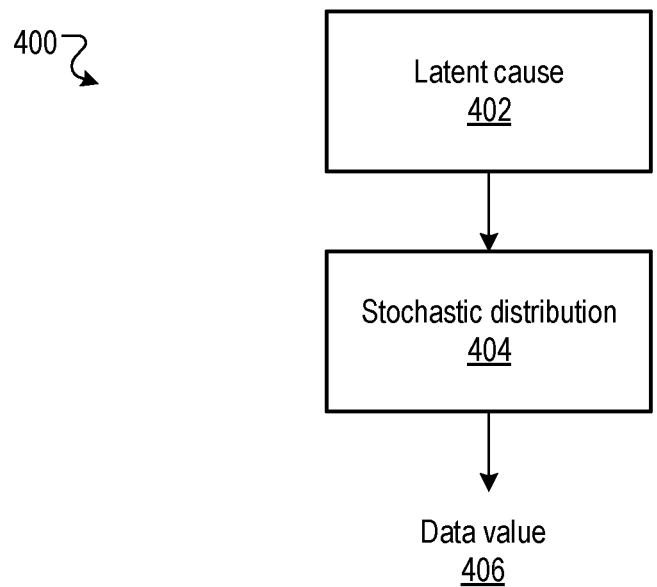
FIG. 4A and FIG. 4B are examples processes showing possible dependencies between latent causes and data values.
Figure 4B:
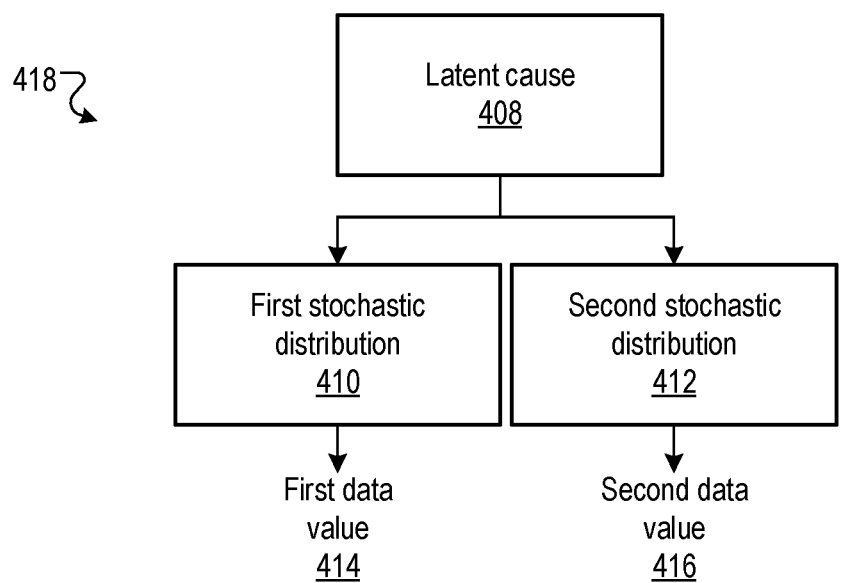

FIG. 4A and FIG. 4B are flow diagram of example process 400 and 418 respectively of possible dependencies between latent causes and data values.

Data values in data streams can be modelled as originating from a latent cause and being transformed by a stochastic process. The latent cause may correspond to the execution of an instruction, the execution of an algorithm, or the execution of a thread, among other things. In general, the latent cause of a data value and the stochastic distribution which determines the data value from the latent cause are not directly observable in the system. FIG. 4A and FIG. 4B show two different example processes which show the dependency of data values on latent causes. Many other types of dependencies are possible. The data disaggregation machine learning model of the computer system control system described in this specification processes data values received as input, and generates as output a descriptor of the latent cause of the data value.

In FIG. 4A, the latent cause 402 is directly transformed by a stochastic distribution 404 to produce a data value 406. For example, the latent cause may correspond to the execution of the instructions of an algorithm by a processor, and the data value may correspond to a memory location accessed by the processor during the execution of the instructions of the algorithm by the processor.

In FIG. 4B, the latent cause 408 is transformed by a first stochastic distribution 410 to produce a first data value 414 and the latent cause 408 is transformed by a second stochastic distribution 412 to produce a second data value 416. For example, the latent cause may correspond to the execution of the instructions of an algorithm by a processor, the first data value may correspond to a memory location accessed by the processor during the execution of the instructions of the algorithm by the processor, and the second data value may correspond to a program counter value of an instruction executed by the processor during the execution of instructions of the algorithm by the processor.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising, at each of a plurality of time steps:

accessing a data stream to obtain one or more data values corresponding to the time step that result from operations performed by a computer system of one or more computers, the data values being descriptive of the operations performed by the computer system;

processing an input comprising the data values corresponding to the time step using a data disaggregation machine learning model and in accordance with a set of data disaggregation machine learning model parameters of the data disaggregation machine learning model to generate a compressed representation of the data values corresponding to the time step;

jointly processing: (i) the data values corresponding to the time step, and (ii) the compressed representation of the data values corresponding to the time step, using a control system model and in accordance with a set of control system model parameters to generate an output specifying commands to modify the operations performed by the computer system; and providing, to the computer system, the commands to modify the operations performed by the computer system.

2. The method of claim 1, further comprising training the data disaggregation machine learning model using log data that stores data values resulting from operations previously performed by the computer system.

3. The method of claim 1, further comprising training the data disaggregation machine learning model using data values from the data stream, and wherein accessing the data stream comprises receiving the data stream from the computer system.

4. The method of claim 1, wherein the data disaggregation machine learning model is at least partially implemented in hardware.

5. The method of claim 1, wherein the data disaggregation machine learning model comprises a variational auto-encoder.

6. The method of claim 1, wherein the data values comprise program counter values, and the operations performed by the computer system include program instruction increments.

7. The method of claim 1, wherein the data values comprise memory address values, and the operations performed by the computer system include memory accesses.

8. The method of claim 1, further comprising:
determining a performance measure of the control system model based on the data values and the outputs specifying commands to modify the operations performed by the computer system; and
adjusting a set of control system model parameters based on the performance measure.

9. The method of claim 1, wherein the control system model comprises a recurrent neural network.

10. The method of claim 1, wherein the commands specified by the output of the control system model comprise commands to pre-fetch data stored at memory addresses.

11. A system comprising:
one or more computers; and
one or more storage devices communicatively coupled to the one or more computers, wherein the one or more storage devices store instructions that, when executed by the one or more computers, cause the one or more computers to perform operations comprising, at each of a plurality of time steps:
accessing a data stream to obtain one or more data values corresponding to the time step that result from operations performed by a computer system of one or more computers, the data values being descriptive of the operations performed by the computer system;

processing an input comprising the data values corresponding to the time step using a data disaggregation machine learning model and in accordance with a set of data disaggregation machine learning model parameters of the data disaggregation machine learning model to generate a compressed representation of the data values corresponding to the time step;

jointly processing: (i) the data values corresponding to the time step, and (ii) the compressed representation of the data values corresponding to the time step, using a control system model and in accordance with a set of control system model parameters to generate an output specifying commands to modify the operations performed by the computer system; and providing, to the computer system, the commands to modify the operations performed by the computer system.

12. The system of claim 11, wherein the operations further comprise training the data disaggregation machine learning model using log data that stores data values resulting from operations previously performed by the computer system.

13. The system of claim 11, wherein the operations further comprise training the data disaggregation machine learning model using data values from the data stream, and wherein accessing the data stream comprises receiving the data stream from the computer system.

14. The system of claim 11, wherein the data disaggregation machine learning model is at least partially implemented in hardware.

15. The system of claim 11, wherein the data disaggregation machine learning model comprises a variational auto-encoder.

16. One or more non-transitory computer storage media storing instructions that when executed by one or more computers cause the one or more computers to perform operations comprising, at each of a plurality of time steps:
accessing a data stream to obtain one or more data values corresponding to the time step that result from operations performed by a computer system of one or more computers, the data values being descriptive of the operations performed by the computer system;

processing an input comprising the data values corresponding to the time step using a data disaggregation machine learning model and in accordance with a set of data disaggregation machine learning model parameters of the data disaggregation machine learning model to generate a compressed representation of the data values corresponding to the time step;

jointly processing: (i) the data values corresponding to the time step, and (ii) the compressed representation of the data values corresponding to the time step, using to a control system model and in accordance with a set of control system model parameters to generate an output specifying commands to modify the operations performed by the computer system; and providing, to the computer system, the commands to modify the operations performed by the computer system.

17. The non-transitory computer storage media of claim 16, wherein the operations further comprise training the data disaggregation machine learning model using log data that stores data values resulting from operations previously performed by the computer system.

18. The non-transitory computer storage media of claim 16, wherein the operations further comprise training the data disaggregation machine learning model using data values from the data stream, and wherein accessing the data stream comprises receiving the data stream from the computer system.

19. The non-transitory computer storage media of claim 16, wherein the data disaggregation machine learning model is at least partially implemented in hardware.

20. The non-transitory computer storage media of claim 16, wherein the data disaggregation machine learning model comprises a variational auto-encoder.

* * * * *